(12) United States Patent
Dejana et al.

(10) Patent No.: US 10,394,766 B2
(45) Date of Patent: Aug. 27, 2019

(54) INTELLIGENT DATA ROUTING AND STORAGE PROVISIONING

(71) Applicant: INTERNATIONAL BUSINESS MACHINES CORPORATION, Armonk, NY (US)

(72) Inventors: Ryan G. Dejana, Longmont, CO (US); Lisa Seacat Deluca, Baltimore, MD (US); Brian D. Goodman, West Redding, CT (US); Daniel C. Krook, Fairfield, CT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 10 days.

(21) Appl. No.: 15/342,426

(22) Filed: Nov. 3, 2016

(65) Prior Publication Data
US 2017/0060859 A1 Mar. 2, 2017

Related U.S. Application Data

(63) Continuation of application No. 13/855,364, filed on Apr. 2, 2013, now Pat. No. 9,569,476.

(51) Int. Cl.
G06F 17/30 (2006.01)
G06F 16/182 (2019.01)
G06F 3/06 (2006.01)
G06F 16/22 (2019.01)

(52) U.S. Cl.
CPC ......... *G06F 16/1827* (2019.01); *G06F 3/067* (2013.01); *G06F 3/0608* (2013.01); *G06F 3/0631* (2013.01); *G06F 3/0635* (2013.01); *G06F 3/0643* (2013.01); *G06F 3/0665* (2013.01); *G06F 16/22* (2019.01)

(58) Field of Classification Search
None
See application file for complete search history.

(56) References Cited

U.S. PATENT DOCUMENTS

| | | | |
|---|---|---|---|
| 7,472,238 B1 | 12/2008 | Gokhale et al. | |
| 8,515,902 B2* | 8/2013 | Savage | G06F 17/30014 707/608 |
| 8,640,251 B1* | 1/2014 | Lee | G06F 17/30091 707/728 |
| 9,076,126 B2* | 7/2015 | Riviello | G06Q 10/10 |

(Continued)

OTHER PUBLICATIONS

Wang, H. et al., "On the Impact of Virtualization on Dropbox-Like Cloud File Storage/Synchronization", IEEE, 2012, 9 pages.

(Continued)

*Primary Examiner* — Alicia M Willoughby
(74) *Attorney, Agent, or Firm* — Brian M. Restauro; Andrew M. Calderon; Roberts Mlotkowski Safran Cole & Calderon, P.C.

(57) ABSTRACT

Approaches for routing data to storage are provided. An approach includes determining implicit metadata from explicit metadata received with a request from a user to store a file. The approach also includes determining a storage resource based on the explicit metadata, the implicit metadata, and a registry of storage resources. The approach additionally includes routing data of the file to the determined storage resource.

20 Claims, 11 Drawing Sheets

(56) References Cited

U.S. PATENT DOCUMENTS

| | | | |
|---|---|---|---|
| 9,501,473 B1* | 11/2016 | Kong | G06F 3/06 |
| 2004/0141661 A1 | 7/2004 | Hanna et al. | |
| 2004/0172419 A1* | 9/2004 | Morris | G06F 17/30265 |
| 2007/0179995 A1* | 8/2007 | Prahlad | G06F 16/24575 |
| 2008/0082983 A1* | 4/2008 | Groetzner | G06F 9/5083 |
| | | | 718/105 |
| 2008/0307191 A1* | 12/2008 | Lane | G06F 3/0608 |
| | | | 711/209 |
| 2009/0043831 A1 | 2/2009 | Antonopoulos et al. | |
| 2010/0145984 A1* | 6/2010 | Palaniappan | G06F 17/30572 |
| | | | 707/769 |
| 2010/0169948 A1 | 7/2010 | Budko et al. | |
| 2010/0332479 A1 | 12/2010 | Prahlad et al. | |
| 2010/0333116 A1 | 12/2010 | Prahlad et al. | |
| 2011/0022642 A1* | 1/2011 | deMilo | G06F 17/30082 |
| | | | 707/805 |
| 2011/0022812 A1* | 1/2011 | van der Linden | G06F 9/5077 |
| | | | 711/163 |
| 2011/0167230 A1* | 7/2011 | Quan | G06F 3/061 |
| | | | 711/154 |
| 2011/0179132 A1 | 7/2011 | Mayo et al. | |
| 2011/0276713 A1 | 11/2011 | Brand | |
| 2011/0289500 A1* | 11/2011 | Strutt | G06F 3/0604 |
| | | | 718/1 |
| 2011/0320605 A1* | 12/2011 | Kramer | H04L 41/0843 |
| | | | 709/226 |
| 2012/0089781 A1 | 4/2012 | Ranade et al. | |
| 2012/0102226 A1* | 4/2012 | Hopmann | H04L 12/6418 |
| | | | 709/241 |
| 2012/0110328 A1 | 5/2012 | Pate et al. | |
| 2012/0147894 A1* | 6/2012 | Mulligan | G06F 9/45533 |
| | | | 370/395.53 |
| 2012/0323977 A1* | 12/2012 | Fortier | G06F 17/30091 |
| | | | 707/812 |
| 2013/0013564 A1* | 1/2013 | Ben-Or | G06F 11/2038 |
| | | | 707/640 |
| 2013/0024481 A1 | 1/2013 | Bolesta et al. | |
| 2013/0054535 A1* | 2/2013 | Ledoux | G06F 8/61 |
| | | | 707/654 |
| 2013/0055211 A1* | 2/2013 | Fosback | G06Q 10/10 |
| | | | 717/126 |
| 2013/0073821 A1* | 3/2013 | Flynn | G06F 3/061 |
| | | | 711/162 |
| 2013/0097651 A1* | 4/2013 | Rendahl | G06F 21/33 |
| | | | 726/1 |
| 2013/0111034 A1* | 5/2013 | Upadhya | G06F 3/0605 |
| | | | 709/226 |
| 2013/0159637 A1 | 6/2013 | Forgette et al. | |
| 2013/0212134 A1 | 8/2013 | S et al. | |
| 2014/0074849 A1* | 3/2014 | Zizka | G06F 17/30091 |
| | | | 707/741 |
| 2014/0108474 A1* | 4/2014 | David | G06F 17/30 |
| | | | 707/827 |

OTHER PUBLICATIONS

He, Q. et al., "Analysis of the Key Technology on Cloud Storage", International Conference on Future Information Technology and Management Engineering, IEEE, 2010, pp. 426-429.

Unknown, "Amazon Web Services: Amazon Simple Storage Service", http://aws.amazon.com/s3/, Amazon, Downloaded on Nov. 12, 2012, 10 pages.

Mell, P., "The NIST Definition of Cloud Computing", National Institute of Standards of Technology, Information Technology Laboratory, Ver 15, Oct. 7, 2009, pp. 1-2.

* cited by examiner

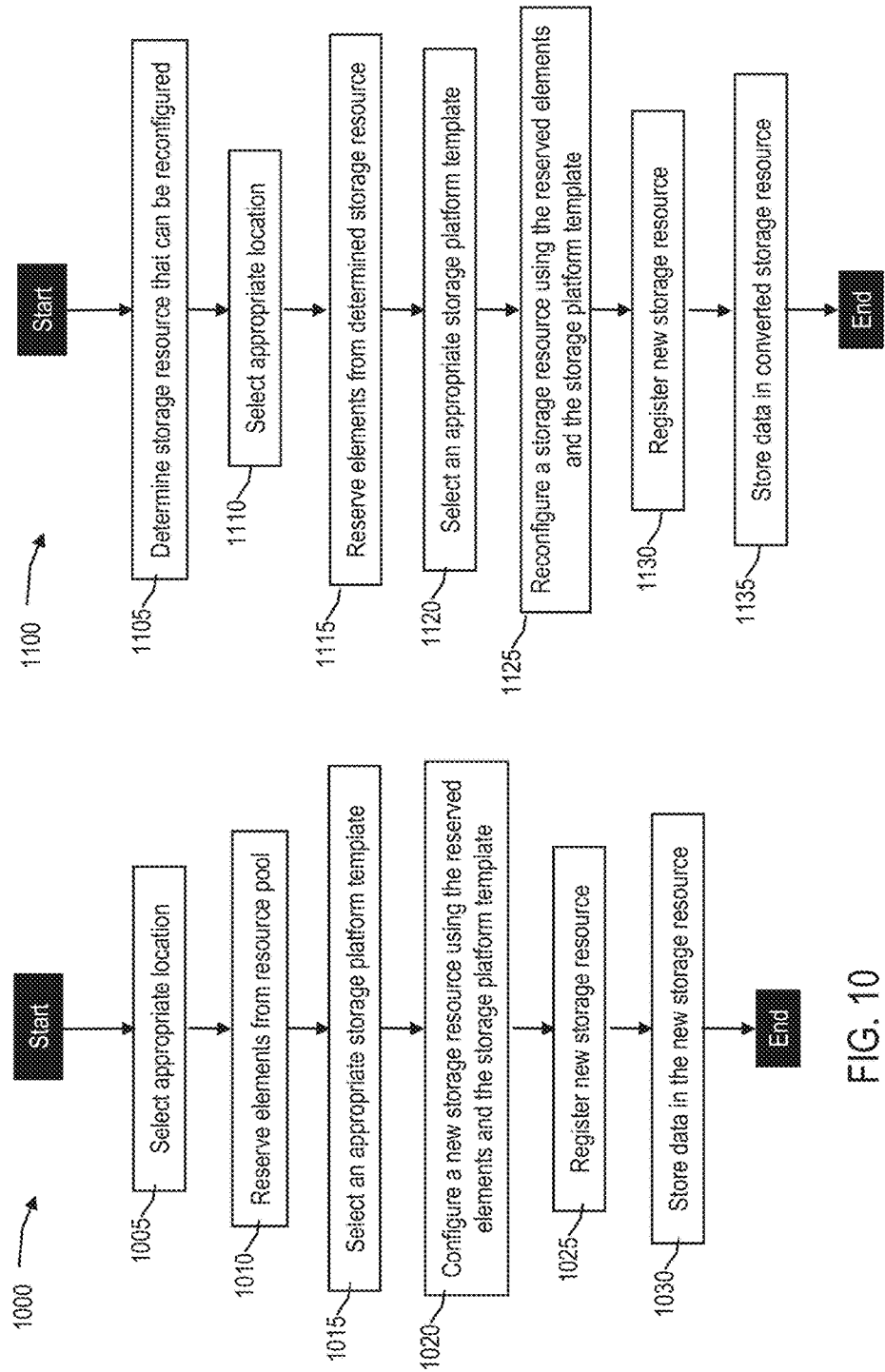

INTELLIGENT DATA ROUTING AND STORAGE PROVISIONING

FIELD OF THE INVENTION

The invention relates to information storage and, more specifically, to provisioning storage.

BACKGROUND

The demand for optimized storage increases as the amount of data accumulated by individuals and organizations grows exponentially. The explosive growth of data is outstripping the ability of organizations to quickly procure supplies sufficient for the demand. Moreover, because they are subject to time and supply constraints, organizations may be unable to procure storage systems having suitable characteristics to optimally handle their data.

Cloud storage services offer organizations an elastic supply of storage. However, these services tend to approach storage of different data types (e.g., structured and unstructured) through a container-object paradigm that results in a "one-size-fits-all" product. As such, current cloud storage services may be unable to intelligently respond with appropriate technology in response to increased demand.

SUMMARY

In a first aspect of the invention there is a method for routing data to storage. The method includes determining implicit metadata from explicit metadata received with a request from a user to store a file. The method also includes determining a storage resource based on the explicit metadata, the implicit metadata, and a registry of storage resources. The method further includes routing data of the file to the determined storage resource. The determining implicit metadata and the determining the storage resource are performed by a computing device including at least one processor.

In accordance with another aspect of the present invention, a computer program product includes a computer usable storage device having readable program code embodied in the storage device. The computer program product includes a component that derives implicit metadata from a request from a user to store data. The computer program product also includes a component that determines whether one of a number of registered storage resources is suitable to store the data based on the derived information. The computer program product additionally includes a component that routes the data based on the derived information and the determining.

In accordance with another aspect of the present invention, a system routes data to storage. The system includes a CPU, a computer readable memory and a computer readable storage media. The system also includes first program instructions that determine that an appropriate storage resource for storing a file received in a storage request is unavailable from a predefined pool of storage providers. The system additionally includes second program instructions that provision a new storage resource. The system further includes third program instructions that store the file in the new storage resource. The first, second, and third program instructions are stored on the computer readable storage media for execution by the CPU via the computer readable memory.

BRIEF DESCRIPTION OF THE SEVERAL VIEWS OF THE DRAWINGS

The present invention is described in the detailed description that follows, in reference to the noted plurality of drawings by way of non-limiting examples of exemplary embodiments of the present invention.

FIG. 10 shows an exemplary process flow diagram for provisioning a new storage resource in accordance with aspects of the present invention.

FIG. 11 shows an exemplary process flow diagram for re-provisioning an existing storage resource in accordance with aspects of the present invention.

DETAILED DESCRIPTION

Figure 1:
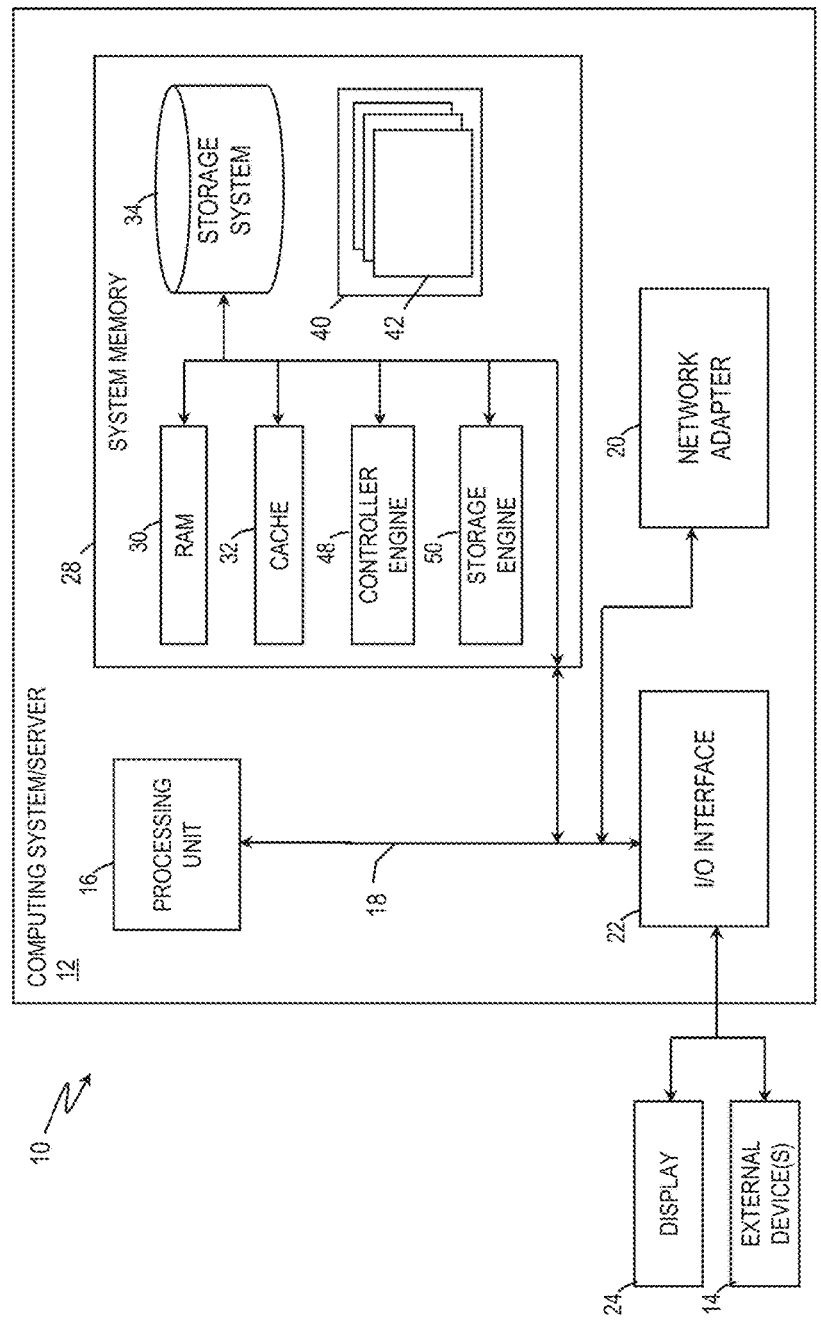
FIG. 1 shows a hardware configuration in accordance with aspects of the present invention.

The invention relates to information storage and, more specifically, to provisioning storage. According to aspects of the invention disclosed herein, an elastic storage platform routes data from a user's file to one of a number of storage locations that optimally suits the data. If no suitable storage location is available, aspects of the invention can dynamically provision, provide, or convert suitable storage.

In the context of the disclosed embodiments, an optimal storage location for user data is one that minimizes cost while meeting all requirements (functional and non-functional) associated with the data. The requirements can include, for example, data requirements (e.g., size or type), usage requirements (e.g., how often the data is accessed), or application requirements (e.g., laws and regulations pertaining to the data). According to aspects of the invention, the optimal storage location can be determined when the data is first stored. It can also be re-determined and modified based on the history of how, when, and where the data is accessed. Accordingly, aspects of the invention route data to the suitable storage location or provision a suitable storage location on-demand to ensure that the storage resources are not over-matched or under-matched to the needs of the data and, thus, make cost-effective use of the storage resources.

In aspects, the invention determines the optimal location to store user data by determining requirements for storing the user data based on explicit information provided with a user's request and implicit information derived from the explicit information. Moreover, according to aspects, the invention intelligently manages storage resources by provisioning, de-provisioning, and/or modifying storage resources as-needed throughout their lifecycles to meet changing demands of different user data.

Based on the aspects described above and detailed below, the invention ensures that the appropriate storage resources are provided to meet exponential demand for storage of, and access to, structured and unstructured user data. This results in cost-efficiency by avoiding expenditures on hardware to supply new storage resources. Additionally, aspects of the invention reduce the risks of data loss that may arise when organizations procure large quantities of low-cost, unreliable hardware to meet storage demands.

In exemplary embodiments of the invention, two systems work together to store data and provision storage resources. Firstly, a controller engine handles requests to store user data, records data locations and tracks access histories. Secondly, a storage engine routes user data to available storage resources and dynamically provisions new storage resources as-needed. For example, when the controller engine receives a user's request to store a file and has an adequate capacity of suitable storage resources is available, the controller engine extracts (e.g., parses) data (i.e., bytes of code) from the file and determines explicit metadata associated with the request. Additionally, the controller engine determines (e.g., derives) implied metadata from the explicit metadata. Further, the controller engine can validate the explicit and implicit metadata (e.g., by comparing it to schema defining data types, ranges, and constraints). Based on the implicit and explicit metadata, the storage engine routes the data to an appropriate and available storage provider. The storage engine indicates success or error to the controller engine which, in turn, records the location of the data and informs the user of the successful fulfillment of the request (or otherwise if the data is not stored).

In accordance with the above example, aspects of the invention minimize storage costs for users that store information at multiple storage providers (i.e., different vendors of remote storage services). In such cases, a particular user may have predefined storage preferences for storing different types of files (e.g., stored in a user account). For example, the user may require that text editor documents be stored by a first provider, encrypted files be stored by a second provider, database records be stored by a third provider, and audiovisual files be stored by a fourth provider. Thus, in accordance with aspects of the invention, the user can upload the file to the controller engine to have the file routed user's preferred storage service based on metadata determined from the user's request and file. As characteristics of the service providers change over time, so can routing. For example, if the cost or available storage increases or decreases the storage engine may select a new storage provider based on the user's predefined requirements.

Further, in accordance with aspects of the invention, user data may be stored when no available storage resources are suitable (e.g., lack storage capacity, appropriate technology, geographic location, security, privacy, etc.) When the storage engine cannot match user data with a suitable storage resource, the storage engine can dynamically provision a new storage resource (raw file system, NoSQL database, relational database) from available storage resource elements. For example, the storage engine can reserve CPUs, memory, and storage devices from a pool at an appropriate data center location, apply a technology platform template, configure the resources based on the template, and store the file to new the storage resource. Alternatively, the storage engine can dynamically provision the new storage resource by reconfiguring or recycling the storage resource elements from previously provisioned storage resources.

Further, in accordance with aspects of the invention, stored data can be reorganized based on access, removal, or other factors. In embodiments, storage resources and/or locations can be regularly checked (e.g., hourly, weekly, monthly, yearly) to determine what resources or locations are no longer in use or are currently available. This determination may be made by identifying resources that have been explicitly released; identifying resources that haven't been accessed in a given period of time; identifying new resources or locations that are available to the system; returning the elements of the storage resources to a resource pool; and marking the elements as available for provisioning.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud user can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple users using a multi-tenant model, with different physical and virtual resources dynamically assigned, and reassigned according to demand. There is a sense of location independence in that the user generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the user, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and user of the utilized service.

Service Models are as Follows:

Software as a Service (SaaS): the capability provided to the user is to use the provider's applications running on a cloud infrastructure. The applications are accessible from various client devices through a thin client interface such as a web browser (e.g., web-based email). The user does not manage or control the underlying cloud infrastructure including network, servers, operating systems, storage, or even individual application capabilities, with the possible exception of limited user-specific application configuration settings.

Platform as a Service (PaaS): the capability provided to the user is to deploy onto the cloud infrastructure user-created or acquired applications created using programming languages and tools supported by the provider. The user does not manage or control the underlying cloud infrastructure including networks, servers, operating systems, or storage, but has control over the deployed applications and possibly application hosting environment configurations.

Infrastructure as a Service (IaaS): the capability provided to the user is to provision processing, storage, networks, and other fundamental computing resources where the user is able to deploy and run arbitrary software, which can include operating systems and applications. The user does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node 10 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable user electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (e.g., a "hard drive"). Although not particularly shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

In accordance with aspects of the invention, cloud computing node 10 includes a controller engine 48 and a storage engine 50. Controller engine 48 may be software, hardware or a combination thereof that, as detailed herein, handles requests from users to store and access data, to record data locations, and to track access history and patterns. Storage engine 50 may be software, hardware or a combination thereof that, as detailed herein, interacts with the controller engine 48 and one or more storage resources to route user data and/or allocate storage resources as needed.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention, and the functionality provided therein, may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device. A computer readable storage medium and/or device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium and/or device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium and/or device may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
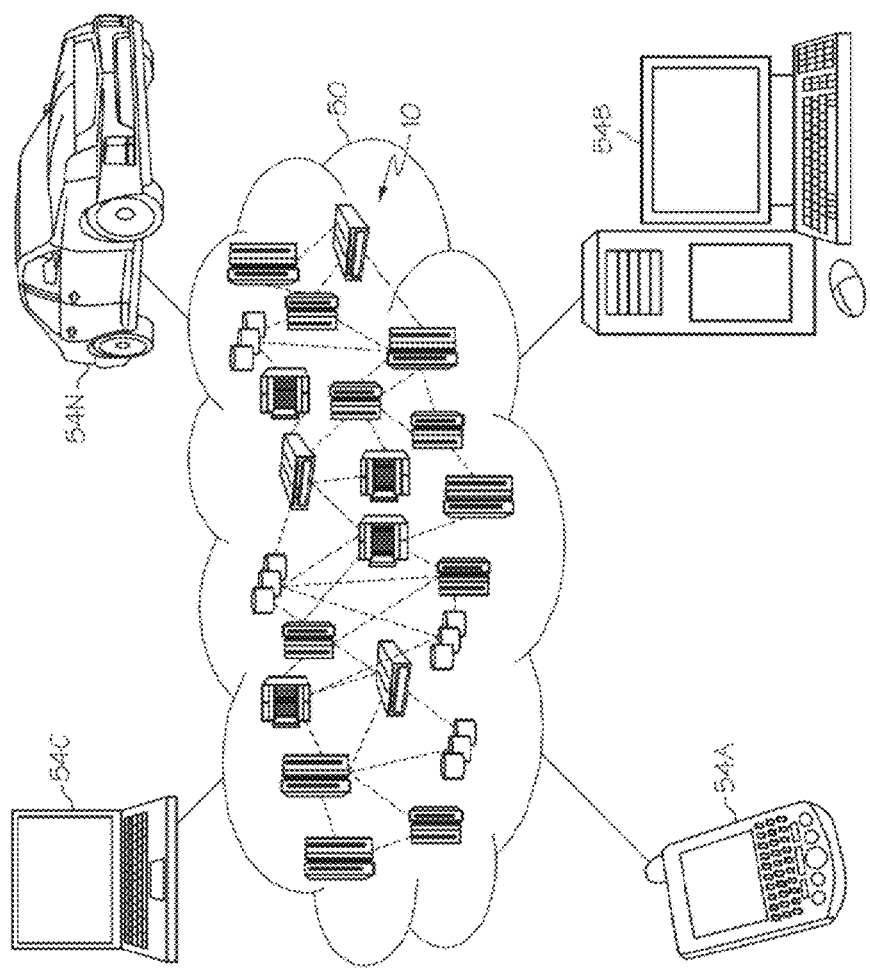
FIG. 2 shows a cloud computing hardware configuration in accordance with aspects of the present invention.

Referring now to FIG. 2, an illustrative cloud computing environment 50 is depicted. As shown, cloud computing environment 50 includes one or more cloud computing nodes 10 with which local computing devices used by cloud users, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud user does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
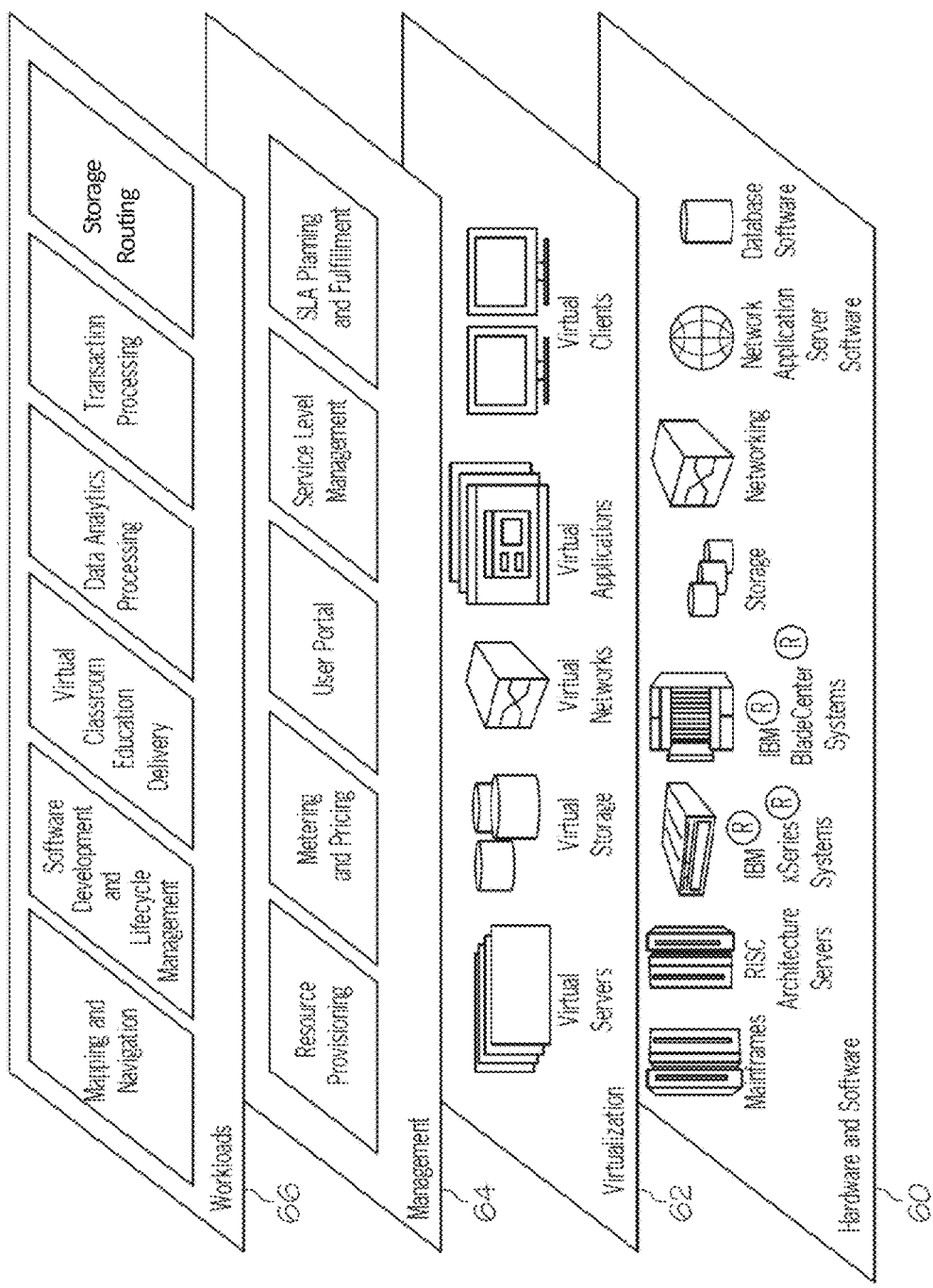
FIG. 3 shows abstraction model layers in accordance with aspects of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). In accordance with aspects of the invention, the storage devices may include archive/backup storage 47 and/or monitoring apparatus 49.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud users and tasks, as well as protection for data and other resources. User portal provides access to the cloud computing environment for users and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage routing. In accordance with aspects of the invention, the storage routing function may include one or more modules that interact with a user via the user portal and service level management functions of the management layer 64 (e.g., controller engine 48) and that route files to appropriate storage resources in hardware and software layer 60 (e.g., storage engine 50). Further, in accordance with aspects of the invention, the storage routing function can use the resource provisioning function of management layer 64 to provision new storage in hardware and software layer 60.

Figure 4:
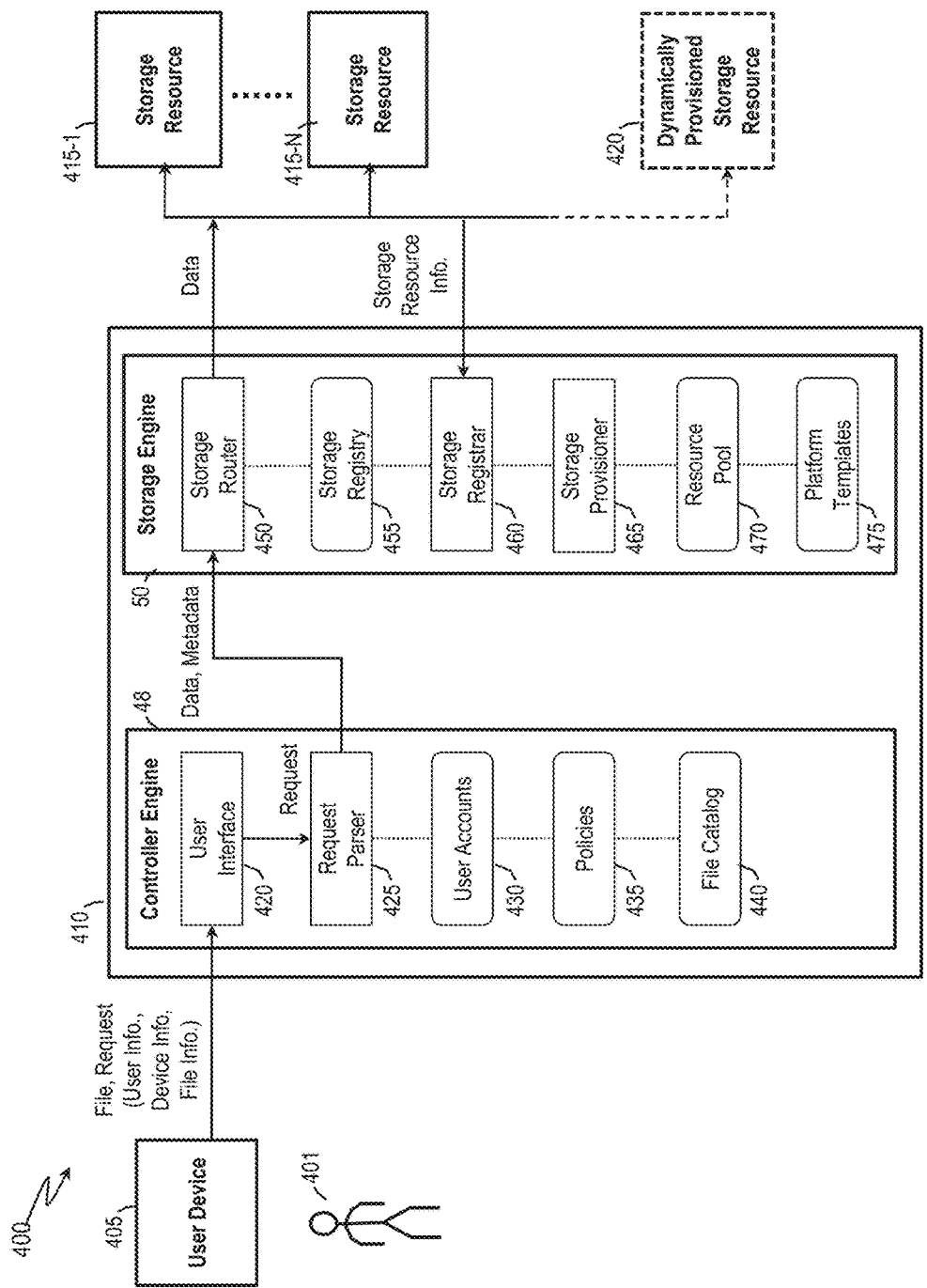
FIG. 4 shows an exemplary functional flow diagram of a network environment in accordance with aspects of the present invention.

FIG. 4 shows an exemplary functional flow diagram of a network environment 400 in accordance with aspects of the present invention. In embodiments, network environment 400 includes a user 401, a user device 405, a network information system 410 (e.g., which may include computing system/server 12), and storage resources 415-1 . . . 415-N. In embodiments, at least two of storage resources 415-1 . . . 415-N are provided by remote storage services operated by different business entities.

As illustrated in FIG. 4, network information system 410 can receive a file in association with a request to store the file from user 401 via user device 405. Network information system 410 determines whether any of the available storage resources 415-1 . . . 415-N are suitable for the storing data in the file. If so, network information system 410 can select and store the file at an optimal one of storage resources 415-1 . . . 415-N. The optimal storage resource is the one of suitable storage resources 415-1 . . . 415-N that satisfies the requirements determined for the file and that minimizes cost (e.g., includes a cost-efficient combination of hardware that meets the requirements for storing the file). On the other hand, if network information system 410 determines that none of the available storage resources 415-1 . . . 415-N are suitable for the file, network information system 410 can dynamically provision an additional storage resource 420 that is suitable to store the file.

User 401 can be an individual, entity, or organization that is one of a number of clients of a service provider that creates, maintains, deploys, and/or supports network information system 410. For example, user 401 can be an employee of a business that relies on the service provider to provide elastic storage resources the business's data. User device 405 can be any computer or terminal through which a user interacts with network information system 415 (e.g., via network adapter 20). For example, user device 405 can be handheld, portable, or desktop computer or the like.

Network information system 410 can be, for example, operated by an individual or an organization that provides a system as a service (SaaS), platform as a service (PaaS), and/or an infrastructure as a service (IaaS) to a number of clients, including user 401. In accordance with aspects of the invention, network information system 410 includes controller engine 48 and storage engine 50, which jointly function to route data in the file from user device 405 to a most suitable one of available storage resources 415-1 . . . 415-N or to dynamically provision an additional storage resource 420 on-demand. While controller engine 48 and storage engine 50 are described as independent elements, it is understood that the functionality of controller engine 48 and storage engine 50 can be combined into a single unit or the respective components divided into separate units.

In embodiments, controller engine 48 includes a user interface 420, a request parser 425, user accounts 430, policies 435, and file catalog 440. User interface 420 is one or more modules of network information system 410 that interacts with user device 405 to exchange information about files of the user stored in storage resources 415-1 . . . 415-N. Request parser 425 analyzes the request and file to determine information (i.e., metadata) used to select a suitable storage resource (e.g., storage resources 415-1 . . . 415-N). User accounts 430 associate one or more types of explicit metadata (e.g., user ID) with information of user 401 (e.g., role type, permission type, and restriction types). Policies 435 include rules that associate one or more types of explicit metadata with implicit metadata (e.g., legal types, confidentiality types, file types, locations types, etc.). File catalog 440 includes information associating user 401 with stored files, file locations, and access histories.

In accordance with aspects of the invention, user 401 at user device 405 can interact with network information system 410 to request storage of a file via user interface 420. In embodiments, network information system can provide user interface 420 via a user portal in management layer 64 though which user device 405 accesses controller engine 48 of network information system 410. Additionally, user interface 420 can authenticate user 401. Authentication may be achieved using any of various conventional security methods. For example, user 401 may provide credentials to user interface 420 to gain access to network information system 410. In embodiments, the credentials can include a user identifier (ID) and/or a passcode (i.e., password) that are authenticated based on information stored in user accounts 430. Further, user interface 420 can interact with user device 405 to obtain information about user device 405. For example, during authentication, user interface 420 can request the type of user device 405 and the location of user device 405 (e.g., mailing address, postal code, or GPS location). Alternatively, user interface 420 can request an Internet protocol address of user device 405, from which the location of user device 405 can be approximated.

In accordance with aspects of the invention, request parser 425 analyzes the information received by user interface 420 to extract data and metadata. In embodiments, request parser 425 determines metadata associated with the request to store the file. The metadata includes explicit metadata parsed from the file and/or the request. The metadata also includes implicit metadata derived from the file and the request using information stored by network information system 410.

Explicit metadata is information expressly provided in association the request. For instance, the request can include user-specified requirements and preferences for storing the file (e.g., cost, confidentiality, durability, redundancy, etc.) for storing the file. The file itself may include explicit metadata specifying a file size (e.g., 1,104 KB) and file extension (e.g., DOC, PDF, DB, XLS, JPG, MP4, etc.). Further, explicit metadata about the user (e.g. a user identifier) and user device 405 (e.g., type and location) can be obtained by user interface 420 via its interactions with user 401 and user device 405 (e.g., during authentication or request submission).

Implicit metadata is information determined by request parser 425 based on the explicit metadata. In embodiments, the implicit metadata includes information about the file, user 401, and/or user device 405. In accordance with aspects of the invention, implicit metadata includes at least one of data type, data size, legal type, confidentiality type, location type, access type, user type, device type, etc.

In embodiments, storage engine 50 includes storage router 450, storage registry 455, storage registrar 460, storage provisioner 465, resource pool 470, and platform templates 475. Storage router 450 is a module of network information system 410 that determines suitable storage resources for files based the explicit and implicit metadata determined by request parser 425 and information in storage registry 455. Storage registry 455 includes information describing characteristics of available storage resources 415-1 . . . 415-N. Storage registry can be maintained by storage registrar 460, which interacts with storage resources 415-1 . . . 415-N (or their respective providers) to receive and update the characteristics of the available storage resources 415-1 . . . 415-N. These characteristics can include, for example, a provider identifier, cost, storage type, storage availability, confidentiality type, legal type, location type, quality type, durability type, etc. Storage router 450 compares the metadata of the file with storage registry 455 and determines which, if any, of storage resources 415-1 . . . 415-N is the most suitable for storing the data of user 401. Further, storage router 450 routes the data in the most suitable one of storage resources 415-1 . . . 415-N and updates file catalog 440 with information describing the location of the stored data for notification or reference by user 401.

Further, in accordance with aspects of the invention, data may be stored when no suitable storage resources are available due to, for example, cost, lack storage space, storage type, geographic location, security, privacy, etc. When storage router 450 determines that none of storage resource 415-1 . . . 415-N are suitable to store the data of user 401, storage router 450 can trigger storage provisioner 465 to provide a new storage resource by dynamically provisioning suitable storage resource 420 from a pool of available storage resource elements identified in resource pool 470 using a suitable template selected from platform templates 475. In embodiments, resource pool 470 is a database associating elements of storage resources (e.g., CPUs, memory, storage devices) available to network information system 410 with their location (e.g., geographic location and data center identifier) and their availability (e.g., available, provisioned, reserved).

In embodiments, platform templates 475 are schema stored in platform storage resources that include predefined configurations of processors, memories, storage devices, and data structures. In accordance with aspects of the invention, storage provisioner 465 can reserve elements (e.g., CPU, memory, and storage devices) from resource pool 470 at an appropriate location, select one of platform templates 475 having characteristics that suit the explicit metadata and the implicit metadata, configure the resources based on the selected platform template, and store the data of file to the new storage resource 420. Alternatively, when storage router 450 receives data but none of available storage resources 415-1 . . . 415-N is suitable, the storage router 450 can trigger storage provisioner 465 to dynamically provision a storage resource 420 from a pool of resources marked for reuse. In such case, storage engine 50 determines which, if any, of available storage resources 415-1 . . . 415-N can be "recycled," reserves CPU, memory, disk capacity from recyclable resources and locations, applies an suitable one of platform templates 475, configures the resources based on the template, and stores the file to the new storage resource 420.

As described above with regard to FIG. 4, network information system 410 routes data included in the file received from user device 405 to one of storage resources 415-1 . . . 415-N. Because one of storage resources 415-1 . . . 415-N is selected based on information derived from the file, rather than merely from explicit requests of user 401, the network information system provides intelligent and cost-effective information storage. Moreover, by dynamically provisioning storage resources, such as storage resource 420, as-needed, network information system 410 can fulfill requests of user 401 in the event that none of the currently available storage resources, such as storage resources 415-1 . . . 415-N, are suitable. Further, network information system 410 can reconfigure or/or recycles unused storage resource elements, which can avoid the cost of procuring new hardware.

Figure 5:
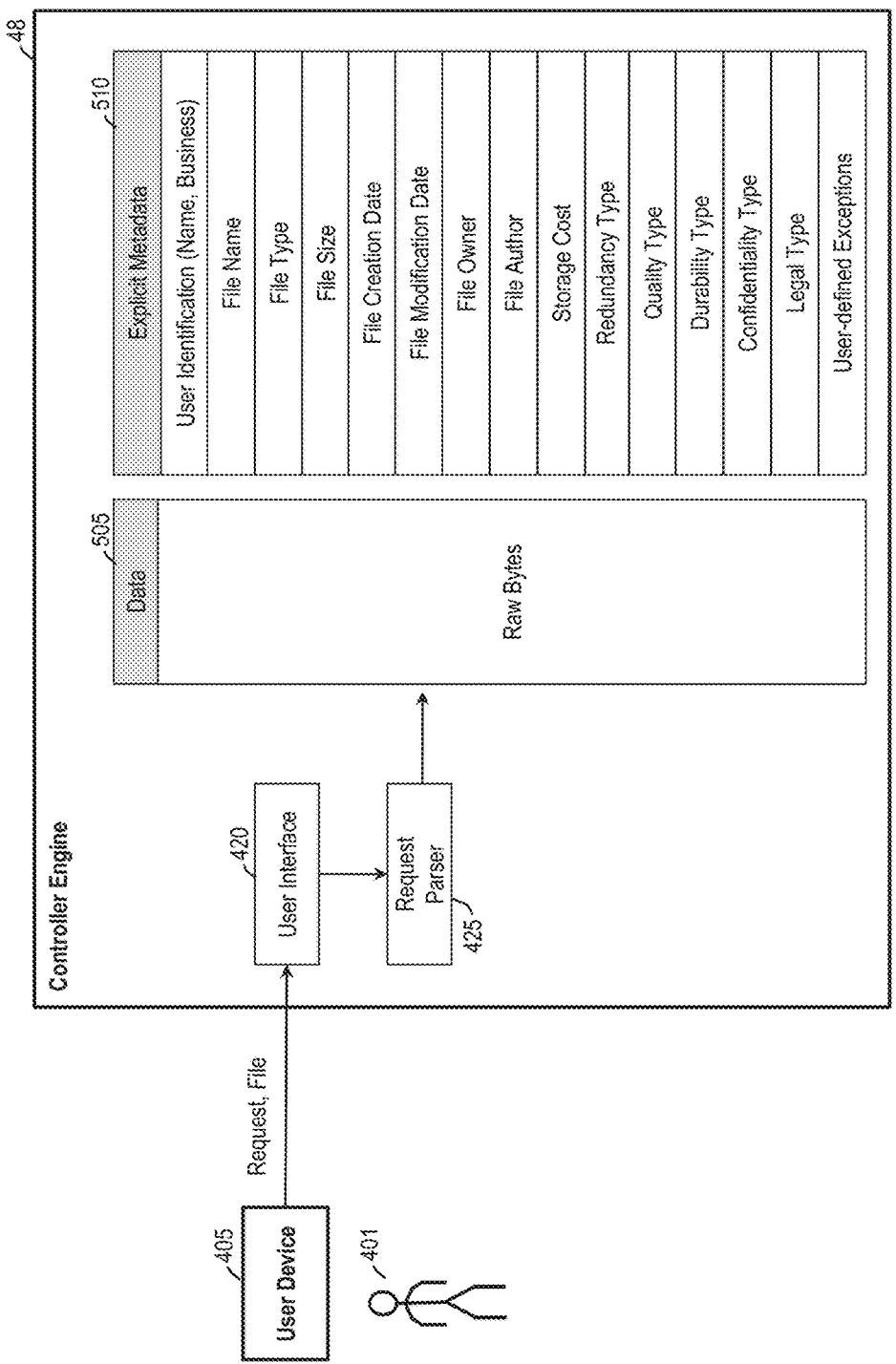
FIG. 5 shows an exemplary functional flow diagram for a controller engine in accordance with aspects of the present invention.

FIG. 5 shows an exemplary functional flow diagram by which controller engine 48 parses a request in accordance with aspects of the present invention. Controller engine 48 receives a request to store a file from a user device 405 via user interface 420. In embodiments, user-interface 420 generates an interactive computer-user interface (e.g., a Web page) that is presented via user device 405 for receiving a request and a file from user 401. For example, user 401 can input request and file information into predefined data entry fields and upload the file using a file transfer protocol. Additionally or alternatively, user interface 420 receives messages (e.g., electronic mail) from user device 405 including the request and the file. While FIG. 5 shows the request and file as separate elements, it will be understood that the file can be incorporated in the request (e.g., similar to an electronic mail attachment). User interface 420 may store the received request and file in a storage device (e.g., storage system 34 of FIG. 1) for subsequent processing by request parser 425.

In embodiments, request parser 425 parsers the request and file into data 505 and explicit metadata 510. Data 505 is comprised of raw information of the file itself (e.g., bytes of code). Explicit metadata 510 is data describing the request and file. In embodiments, explicit metadata 510 included with the request includes authorization information obtained by user interface 420 from user 401, such as a user identification (e.g., a user name) and client identifier (e.g., a domain name). Further, explicit metadata 510 included in the file may include a file name, a file extension, a file size, a file creation date, a file modification date, a file owner, a file author, etc. Explicit metadata 510 provided by user 401 may include, but is not limited to, a cost, a redundancy type, a quality type, a durability type, a confidentiality type, a legal type, and user-defined exceptions.

Figure 6:
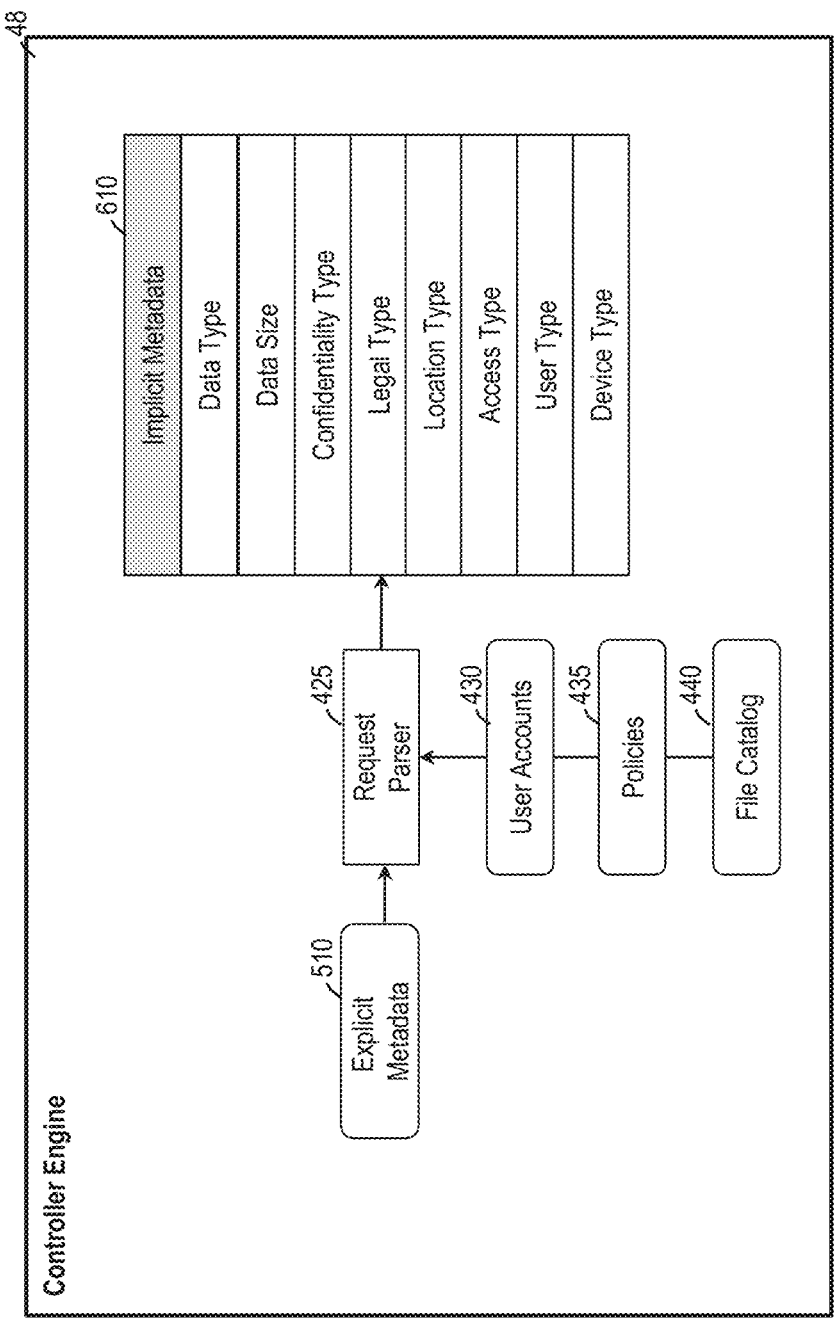
FIG. 6 shows an exemplary functional flow diagram for a controller engine in accordance with aspects of the present invention.

FIG. 6 shows an exemplary functional flow diagram by which controller engine 48 determines implicit metadata 610 from explicit metadata 510 in accordance with aspects of the present invention. Implicit metadata 610 provided by user 401 may include, but is not limited to, data type, data size, confidentiality type, legal type, location type, access type, user type, and device type. In embodiments, request parser 425 analyzes explicit metadata 510 to determine implicit metadata 610 using information stored by network information system 410 in user accounts 430, policies 435, and/or file catalog 440. Request parser 425 can determine some implicit metadata 610 based only on the file and/or information included in the request. For example, request parser 425 can directly calculate the size of the data portion of the file after parsing the data from the metadata. Additionally, request parser can determine implicit metadata 610 based on information stored by network information system, including user accounts 430, policies 435, and file catalog 440. For example, based a rule stored in policies 435 for explicit metadata of the file (e.g., a file extension) and restrictions associated with the explicit metadata of the user (e.g., user ID), request parser 425 can determine implicit metadata defining user rights, such a number of users permitted to access the file, identifications of users permitted to access the file, and types (e.g., roles) of users permitted to access the file of user 401 in user accounts 430. Further, using predefined rules in policies 435 for explicit metadata of the file, request parser 425 can determine implicit metadata defining a file classification (e.g., publication, document, media, and database). Further, using predefined rules in policies 435, explicit metadata of user 401, and explicit metadata of device 405, request parser 425 can determine implicit metadata defining legal types and confidentiality types (e.g., confidential, secret, privileged, personal). Further, using predefined rules in policies 435 and file catalog 440, request parser 425 can determine implicit metadata defining location types.

Figure 7:
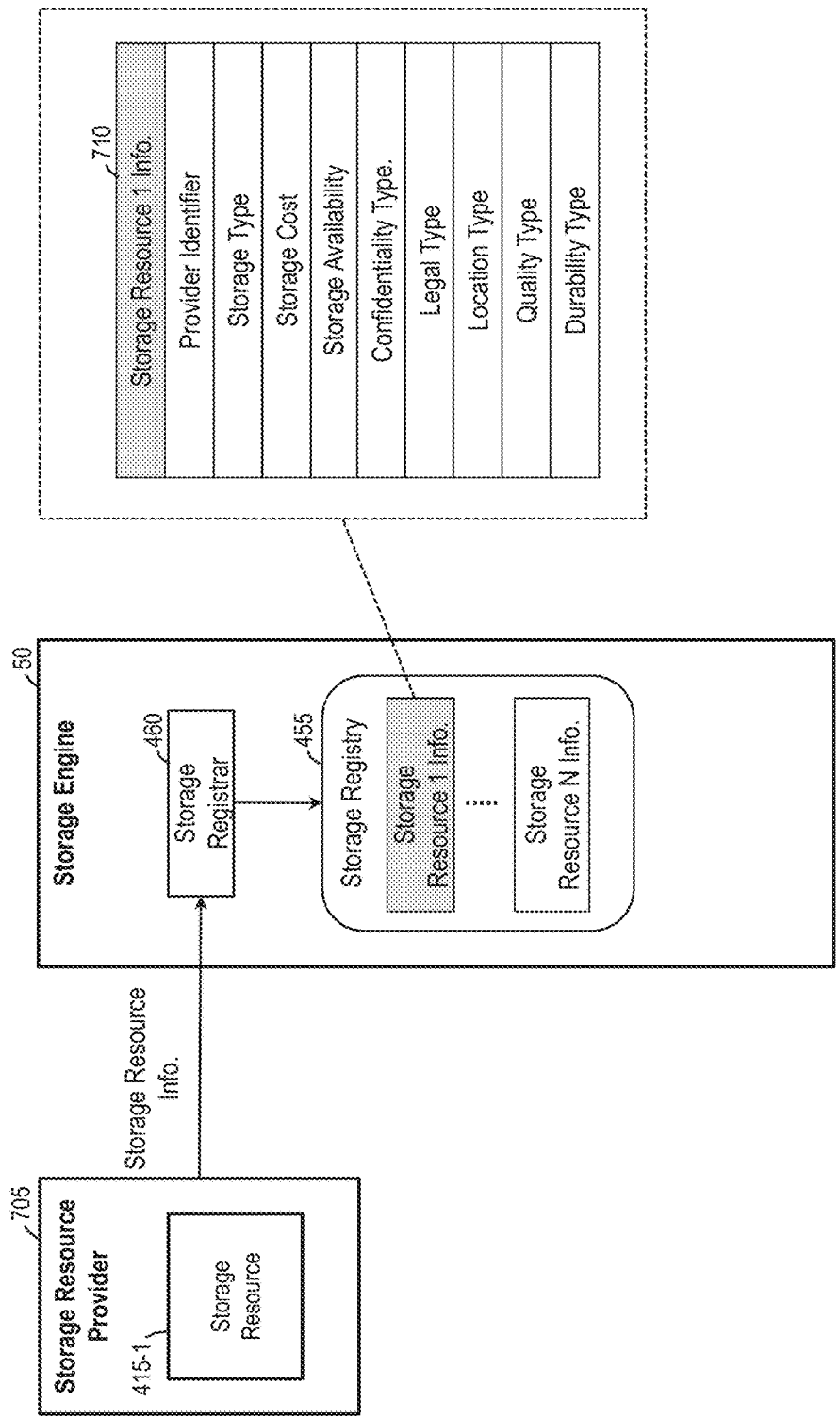
FIG. 7 shows an exemplary system flow diagram for a storage engine in accordance with aspects of the present invention.

FIG. 7 shows an exemplary system flow diagram for storage engine 50 by which storage resources (e.g., storage resources 415-1 . . . 415-N) register with a network information system (e.g., network information system 410) in accordance with aspects of the present invention. In embodiments, a storage resource provider 705 interacts with storage registrar 460 to register storage resource information 710 of storage resource 415-1 with storage engine 50, which stores storage resource information 710 in storage registry 455. Storage resource provider 705 can be one of a number of storage providers associated with network information system 410 and offer storage services to user 401. For example, storage resource provider 705 can be one of a number of commercial storage providers, including the operator of network information system 410. Storage resource provider 705 can provide storage resource information 710 corresponding to storage resource 415-1 when this storage resource is initially provisioned to network information system 710 and, subsequently, interact with storage registrar 460 to keep the information current. Storage resource information 710 can include, but is not limited to, a provider identifier, a storage type, storage cost, storage availability, confidentiality type, legal type, location type, quality type, and durability type. In accordance with aspects of the invention, storage resource provider 705 regularly updates storage resource information 710 to reflect changes in the information (e.g., storage availability).

Figure 8:
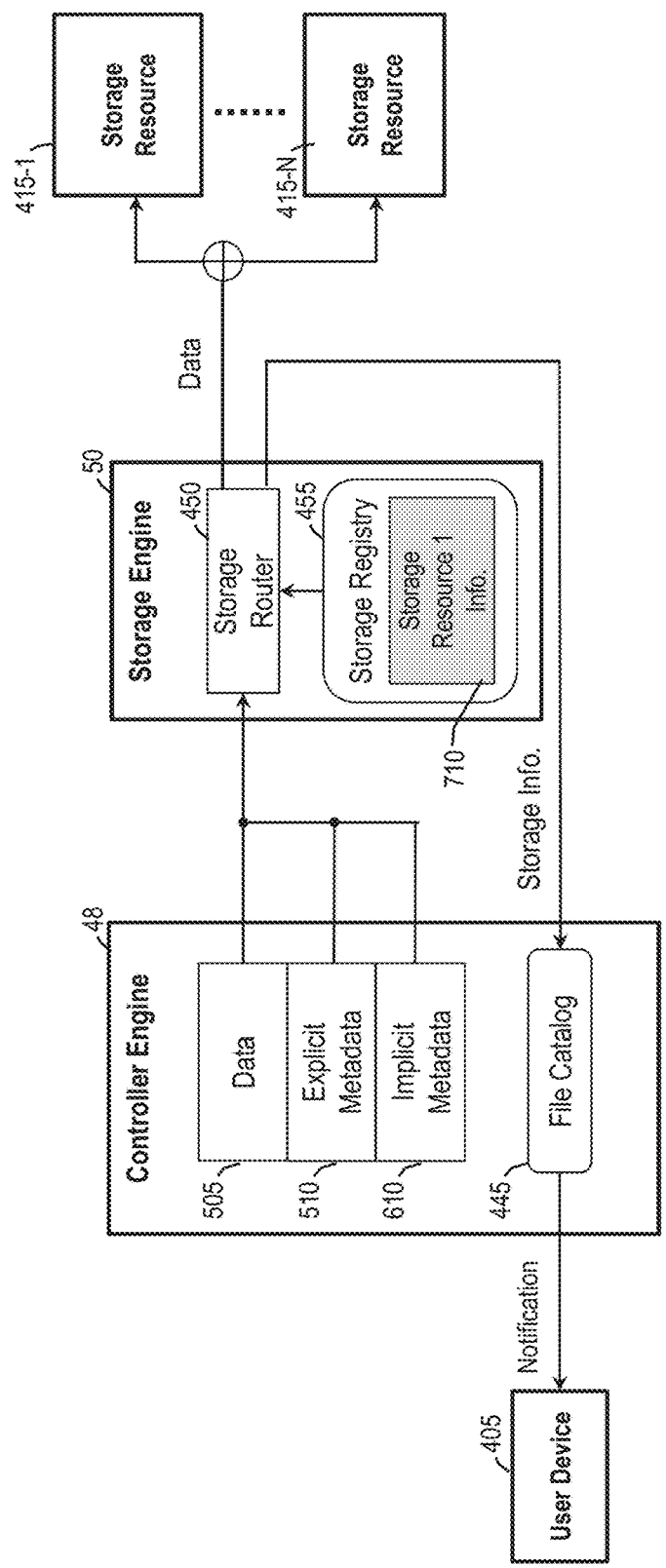
FIG. 8 shows an exemplary functional flow diagram for an environment in accordance with aspects of the present invention.

FIG. 8 shows an exemplary functional flow diagram for a network information system (network information system 410) in accordance with aspects of the invention. That is, in accordance with aspects of the present invention, storage router 450 in storage engine 50 receives data 505, explicit metadata 510 and implicit metadata 610 determined by controller engine 48 (e.g., request parser 425). Storage router 450 compares explicit metadata 510 and/or implicit metadata 610 with storage resource information (e.g., storage resource information 710) stored in storage registry 455 corresponding to characteristics of each storage resource 415-1 . . . 415-N. Based on the comparison, storage router 450 selects one of storage resources 415-1 . . . 415-N that optimally matches the explicit metadata 510 and implicit metadata 610. In the event an optimal match is determined, storage router routes data 505 to the selected one of storage resources 415-1 . . . 415-N and updates file catalog 440 at controller engine 48 with information describing the location of the stored data 505. In embodiments, in response to receiving the storage location information, controller engine 48 sends a notification to user device 405 of the successful storage of the file and/or its location.

FIGS. 9-12 show exemplary flows for performing aspects of the present invention. The steps of FIGS. 9-12 can be implemented in any of the environments of FIGS. 1-8, for example.

The flowcharts in FIGS. 9-12 illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIGS. 1-8. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 9:
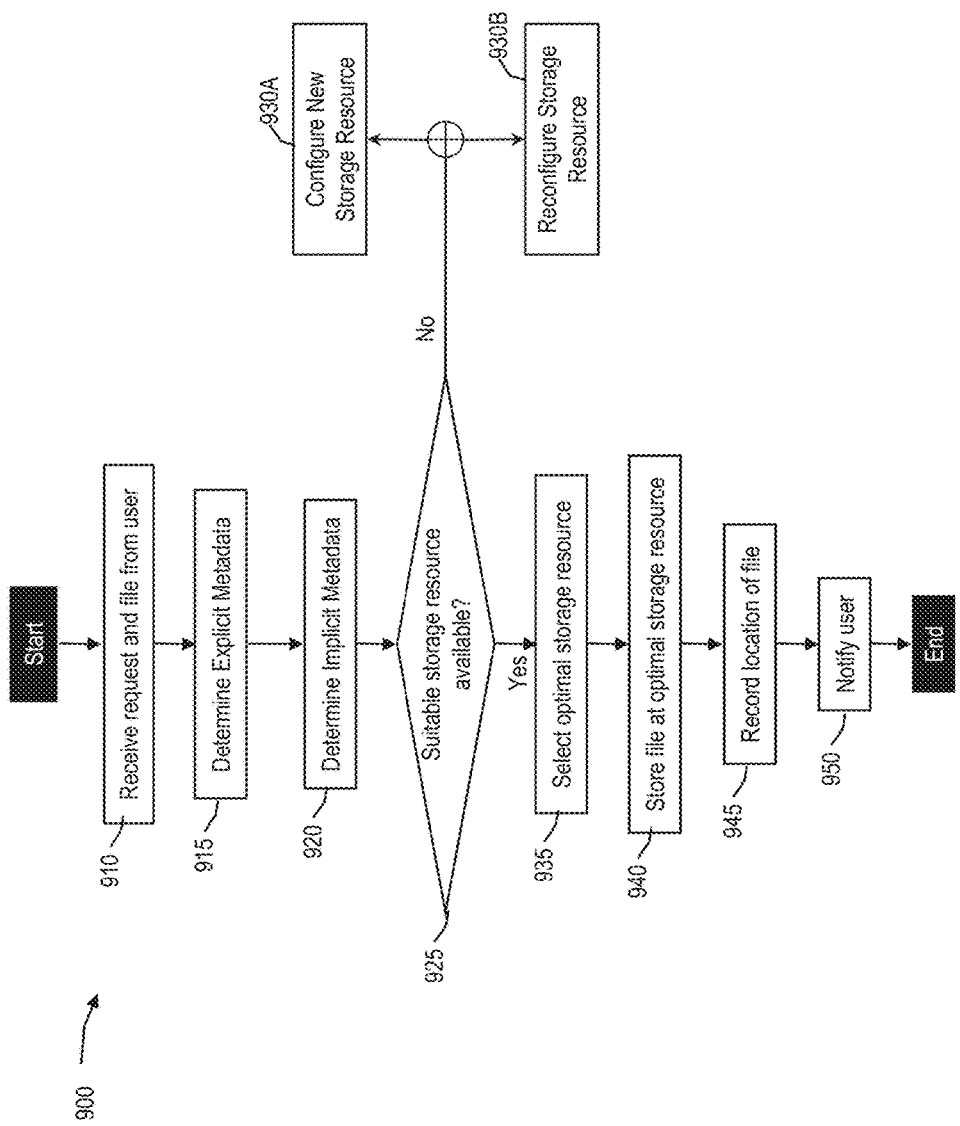
FIG. 9 shows an exemplary process flow diagram for routing a file to a storage resource in accordance with aspects of the present invention.

FIG. 9 shows an exemplary process flow diagram 900 for fulfilling a file storage request in accordance with aspects of the present invention. At step 910, a network information system (e.g., network information system 410 executing controller engine 48) receives a request to store a file from a user device (e.g., user device 405) of a user (e.g., user 401). The request may be received, for example, through user interface (e.g., user interface 420) of the network information system. The file may be received, for example, via a file transfer module provided with the user interface. Alternatively, the user interface may receive the request in a message from the user, which includes the file as an attachment.

At step 915, the network information system (e.g. via request parser 425) determines explicit metadata associated with the request and the file received in step 910. In accordance with aspects of the invention, the network information system parses the request and the file into raw data (e.g., data 505) and explicit metadata (e.g., explicit metadata 510) included in the file and the request (e.g., in the manner described with respect to FIG. 5). For example, the network information system may parse a file extension (e.g., PDF, DOC, MOV) from the name of the file; a user ID from the user's login, and device identifier (e.g., IP address) from the user device. Additionally, the network information system may parse storage requirements (e.g., redundancy, quality, durability, etc.) from information expressly provided with the request or the file.

At step 920, the network information system determines implicit information associated with the user, the user device, the request, and the file. In accordance with aspects of the invention, the network information system (e.g., using storage router 450) determines the implicit metadata (e.g., implicit metadata 610) from the explicit metadata determined at step 915 based on predefined information available to the network information system (e.g., user accounts 430, policies 435, and file catalog 440) using predefined rules (e.g. policies 435) (e.g., in the manner described with respect to FIG. 6). For example, the network information system may calculate the size of the data of the file to determine a storage availability value. Further, the network information system can determine confidentiality, legal, and location requirements based on the file type, user's identification, and device location based on the predefined rules.

At step 925, the network information system determines whether a suitable storage resource (e.g., storage resources 415-1 . . . 415-N) is available. In accordance with aspects of the invention, the network information system compares some or all of the explicit metadata determined at step 915 and implicit metadata determined at step 920 with predefined information describing characteristics of the available storage resources (e.g., in storage registry 455) (e.g., in the manner described with respect to FIG. 8). For example, the network information system may compare the data size, confidentiality type, location type, and quality type metadata of the file with corresponding information of each storage resource in the registry. For each comparison, the network information system determines whether the characteristic of respective storage resource is suitable for the user's data. A characteristic is considered suitable when it meets or exceeds the requirements of the metadata. For example, metadata for the file may indicate low durability type. Accordingly, network information system may determine that a storage resource is suitable in this respect if its storage resource information indicates low, medium, or high durability. The network information system determines that the storage resource is unsuitable when it the storage resource information does not satisfy one or more of the metadata items.

Additionally, in accordance with aspects of the invention, the network information system may rank each of the storage resources according to the extent their characteristics meet or exceed the metadata. If the network information system determines that none available storage resource is suitable (i.e., step 925, "No"), in accordance with aspects of the invention, the network information system can dynamically provision a suitable storage resource by configuring a new storage resource, at step 930A, as described in detail in FIG. 10. Alternatively, in accordance with aspects of the invention, the network information system can reconfigure an existing storage resource at step 930B, as described in detail in FIG. 11.

If at step 925, the network information system determines that a suitable storage resource is available (i.e., step 925, "Yes"), at step 935, the network information system selects the optimal storage resource and, at step 940, stores the data at the selected storage resource. For example, the network information system selects the storage resource having the highest rank determined at step 925. In other words, the network information system selects the storage resource meeting all the requirements indicated by the metadata with minimal over-capacity (i.e., that least exceeds the requirements without failing to meet any requirements). At step 945, the network information system records the location of the stored file (e.g., in file catalog 440). At step 950, the network information notifies the user, via a user device, the request to store the file has been fulfilled and/or the location of the stored file. Buy storing the data of the user's file in accordance with the exemplary process above, embodiments of the present invention route user's file to suitable storage locations while minimizing costs associated with features (e.g. type, location, confidentiality, quality, durability, etc.) that are not required or requested by the user.

FIG. 10 shows an exemplary process flow diagram 1000 for provisioning a new storage resource in accordance with aspects of the present invention, for example, as described at step 930A of FIG. 9. As described above with regard to FIG. 9, if at step at step 925, the network information system determines that no suitable storage resource is available for the data of the user, the network information system can dynamically provision a suitable storage resource by configuring a new, suitable storage resource at step 930A. Flow diagram 1000 depicts exemplary steps involved in step 930A in order to configure a new storage resource that satisfies the explicit and implicit metadata of the request and file. In accordance with this aspect of the invention, at step 1005, the network information selects an appropriate location (e.g., data center meeting satisfying location in implicit metadata 610 and having available storage resource elements). At step 1010, the network information system (e.g., computing system/server 12 executing storage provisioner 465), reserves the elements from a resource pool (e.g., resource pool 470) at the location determined in step 1005 by allocating the elements to the new storage resource. For example, the storage provisioner may reserve storage resource elements including processors and memory corresponding to a type of storage device that satisfies the requirements for a storage type in implicit metadata 610.

At step 1015, the network information selects an appropriate platform template (e.g., from platform templates 475). For example, the storage provisioner may select a platform template having a configuration that satisfies the requirements corresponding to the explicit and implicit metadata of the request and file. At step 1020, the network information system configures the reserved elements from step 1010 according to the selected platform template of step 1015. At step 1025, the network information system registers information (e.g., storage resource information 710) of the new storage resource (e.g., dynamically provisioned storage resource 420 configured at step 1020) with the network information system (e.g., in storage registry 455 via storage registrar 460). At step 1030, the network information system stores the file in the new storage resource.

FIG. 11 shows an exemplary process flow diagram 1100 for converting a storage resource in accordance with aspects of the present invention, for example, as described at step 930B of FIG. 9. As described above with regard to FIG. 9, if at step at step 925, the network information system determines that no suitable storage resources is available, the network information system can dynamically provision a new, suitable storage resource by reconfiguring an existing storage resource at step 930B. Flow diagram 1100 depicts exemplary steps involved in step 930B in order to configure a new storage resource that satisfies the explicit and implicit metadata of the request and file. In accordance with this aspect of the invention, at step 1105, the network information determines existing storage resources that can be reconfigured. For example, one or more of storage resources (e.g., storage resources 415-1 . . . 415-N) may be provided by the operator of network information system and can be reconfigured. In embodiments, the network information system may determine that a storage resource is unused or underused based on information stored provided by the storage resources (e.g., in storage registry). For example, the network information may determine that the percentage of space available on the storage resources is below a predetermined threshold.

At step 1110, the network information system selects one of the available storage resources at an appropriate location for the file (e.g., data center meeting satisfying location in implicit metadata 610 and having available storage resource elements). At step 1115, the network information system reserves the elements from the selected storage resource determined at step 1110. For example, the storage provisioner may reserve storage resource elements including processors and memory corresponding to a type of storage device that satisfies the requirements for a storage type in implicit metadata 610. At step 1120, the network information selects an appropriate storage platform template (e.g., platform templates 475). For example, the storage provisioner may select a platform template having a configuration that satisfies the requirements corresponding to the explicit and implicit metadata of the request and file. At step 1125, the network information system configures the reserved elements of step 1115 according to the platform template determined at step 1120. At step 1130, the network information system registers the new storage resource determined at step 1125 (e.g., in storage registry 455). At step 1135, the network information system stores the file in the new storage resource.

Figure 12:
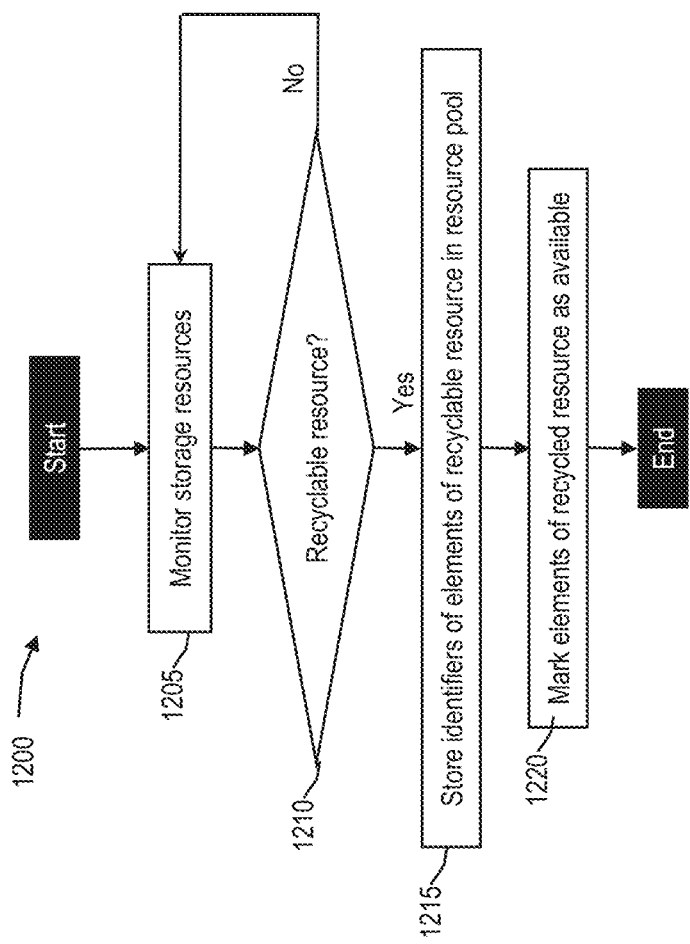
FIG. 12 shows an exemplary process flow diagram for recycling a storage resource in accordance with aspects of the present invention.

FIG. 12 shows an exemplary process flow diagram 1200 for recycling elements of a storage resource in accordance with aspects of the present invention. As described above with regard to FIG. 11, the network information system (network information system 410) can dynamically reconfigure unused or underused storage resources to make them suitable for storing a user's file. Additionally, according to aspects of the invention, the network information system identifies unused or underutilized storage resources (e.g., storage resources 415-1 . . . 415-N) to make their elements available for provisioning. At step 1205, the network information system iteratively monitors the storage resources. In embodiments the monitored storage resources are one or more storage resources provided by the network information system, rather than a third-party provider. In embodiments, the network information system monitors status information provided by the storage resources (e.g., in storage registry 455). At step 1210, the network information system determines whether any of these storage resources are recyclable based on the information determined at step 1205. If not, the network information system iteratively returns to step 1205 and monitors the storage resources. For example, the network information may determine that the percentage of space available on the storage resources is below a predetermined threshold. If at step 1210, the network information system determines that a storage resource is recyclable, then at step 1215, the network information system stores identifiers of the elements of the storage resource in a resource pool (e.g., resource pool 470) and, at step 1220, marks the recycled elements as available for provisioning.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for routing data to storage comprising:
   receiving, from a remote computing device, a user request to store a file and the file to be stored;
   parsing both the request and the file to be stored into data comprising raw data and explicit metadata describing both the request and the file to be stored;
   determining implicit metadata from the explicit metadata;
   validating the explicit metadata and the implicit metadata by comparing to schema stored in storage resources that include predefined configurations of processors, memories, storage devices and data structures;
   determining a storage resource based on the explicit metadata, the implicit metadata, and a registry of the storage resources,
   wherein the registry of storage resources includes information describing characteristics of available storage resources and the determining comprises comparing the implicit metadata and the explicit metadata to the characteristics of the available storage resources, wherein the characteristics of the available storage resources are regularly updated, and wherein the explicit metadata comprises information provided by the file to be stored and information provided by the user in the request;
   routing the file to be stored to the determined storage resource; and
   tracking access history and patterns to re-determine a storage location based on the access history and patterns,
   wherein the determining implicit metadata and the determining the storage resource are performed by a computing device comprising at least one processor.

2. The method of claim 1, wherein the determining the implicit metadata comprises determining information about the user, the request, and the file.

3. The method of claim 2, wherein the determining implicit metadata uses one or more predefined policies corresponding to the explicit metadata.

4. The method of claim 1, wherein the determining the storage resource comprises selecting one of a plurality of storage resources from the registry of storage resources.

5. The method of claim 1, wherein at least two of the plurality of storage resources are provided by remote storage services operated by different entities.

6. The method of claim 1, wherein the determining the storage resource comprises dynamically provisioning a new storage resource based on the implicit metadata and the explicit metadata, the provisioning including:
   selecting a platform template from a group of platform templates, the platform template having characteristics that suit the explicit metadata and the implicit metadata; and
   configuring at least one of the available storage resources based on the selected platform template to generate the new storage resource.

7. The method of claim 6, wherein the provisioning the new storage resource comprises selecting the at least one of the available storage resource from a pool of available storage resource elements.

8. The method of claim 6, wherein the provisioning the new storage resource comprises determining available storage resources which can be converted and converting the available storage resources which can be converted to generate the new storage resource.

9. The method of claim 1, wherein a service provider at least one of creates, maintains, deploys and supports a computer infrastructure that determines the implicit metadata, determines the storage resource, and routes the data of the file.

10. The method of claim 1, wherein steps of claim 1 are provided by a service provider on a subscription, advertising, and/or fee basis.

11. The method of claim 1, wherein:
   the explicit metadata comprises a plurality of explicit metadata and the implicit metadata comprises a plurality of implicit metadata;
   the registry of storage resources comprises predefined information describing characteristics of available storage resources; and
   the determining the storage resource comprises comparing the plurality of explicit metadata and the plurality of implicit metadata to the predefined information describing characteristics of available storage resources.

12. The method of claim 1, wherein:
   the explicit metadata is selected from the group consisting of: file name, file type, file size, file creation date, file modification data, file owner, file author, storage costs, redundancy type, quality type, durability type, confidentiality type, legal type, user-defined exceptions and combinations thereof;
   the implicit metadata determined from the explicit metadata is selected from the group consisting of: data type, data size, confidentiality type, legal type, location type, access type, user type, device type and combinations thereof; and
   the determining the implicit metadata from the explicit metadata comprises utilizing rules stored in a controller engine that associate one or more types of explicit metadata with implicit metadata.

13. The method of claim 1, wherein the determining implicit metadata comprises utilizing stored policies associating one or more types of explicit metadata with types of implicit metadata to derive the implicit metadata from the explicit metadata.

14. The method of claim 13, wherein the implicit metadata is selected from the group consisting of: legal types, confidentiality types and combinations thereof.

15. The method of claim 14, wherein the implicit metadata comprises confidentiality types selected from the group consisting of: confidential type, secret type, privileged type, personal type, and combinations thereof.

16. A system for routing data to storage, the system comprising:
- a central processing unit (CPU), a computer readable memory and a computer readable storage media;
- program instructions to receive a storage request to store a file and the file to be stored;
- program instructions to parse both the storage request and the file to be stored into data comprising raw data and explicit metadata describing the storage request and the file to be stored;
- program instructions to check storage resources and locations to determine what storage resources or locations are no longer in use or are currently available by identifying the storage resources and the locations that have been explicitly released;
- program instruction to identify the storage resources and the locations that have not been accessed in a given period of time;
- program instruction to identify new resources or locations that are available to the system;
- program instructions to determine that an appropriate storage resource for storing the file is unavailable from at least one of a predefined pool of remote storage providers based on the explicit metadata received with the storage request, implicit metadata derived from the explicit metadata based on rules associating one or more types of explicit metadata with implicit metadata, and a registry of storage resources, wherein the implicit metadata is different from the explicit metadata and includes data type, data size, confidentiality type, legal type, location type, access type, user type and device type;
- program instructions to provision a new remote storage resource when it is determined that the appropriate storage resource is unavailable;
- program instructions to store the file in the new remote storage resource; and
- program instructions to de-provision the new remote storage resource to meet demands of different user data,
- wherein each of the program instructions are stored on the computer readable storage media for execution by the CPU via the computer readable memory.

17. The system of claim 16, further comprising:
program instructions to iteratively monitor a plurality of registered storage resources;
program instructions to determine that one or more of the plurality of registered storage resources can be recycled; and
program instructions to store identifiers of elements of the one or more of the plurality of registered storage resources in a resource pool and mark the elements as available.

18. The system of claim 16, wherein:
the explicit metadata is selected from the group consisting of: file name, file type, file size, file creation date, file modification data, file owner, file author, storage costs, redundancy type, quality type, durability type, user-defined exceptions and combinations thereof; and
the system further comprises program instructions to derive the implicit metadata from the explicit metadata utilizing the rules stored in a controller engine.

19. The system of claim 16, wherein the implicit metadata comprises confidentiality types selected from the group consisting of: confidential type, secret type, privileged type, personal type, and combinations thereof.

20. The system of claim 16, wherein the provisioning comprises:
selecting a platform template from a group of platform templates, the platform template having characteristics that suit the explicit metadata and the implicit metadata; and
configuring at least one of the available storage resources based on the selected platform template to generate the new storage resource.

* * * * *